United States Patent [19]

Cherukuri et al.

[11] Patent Number: 4,900,563
[45] Date of Patent: Feb. 13, 1990

[54] FRUCTOSE SWEETENED CHEWING GUM COMPOSITIONS

[75] Inventors: Subraman R. Cherukuri, Towaco; Krishna P. Raman, Randolph, both of N.J.

[73] Assignee: Warner-Lambert Company, Morris Plains, N.J.

[21] Appl. No.: 291,708

[22] Filed: Dec. 29, 1988

[51] Int. Cl.$^4$ .............................................. A23G 3/30
[52] U.S. Cl. ................................. 426/5; 426/658; 426/804; 426/548
[58] Field of Search ....................... 426/3-6, 426/548, 658, 804

[56] References Cited

U.S. PATENT DOCUMENTS

| | | | |
|---|---|---|---|
| 4,151,270 | 4/1979 | Ream | 426/3 |
| 4,271,197 | 6/1981 | Hopkins | 426/3 |
| 4,271,199 | 6/1981 | Cherukuri et al. | 426/658 |
| 4,409,244 | 10/1983 | Cherukuri et al. | 426/5 |
| 4,581,234 | 4/1986 | Cherukuri et al. | 426/3 |
| 4,676,991 | 6/1987 | Batterman et al. | 426/658 |

FOREIGN PATENT DOCUMENTS 8401693  5/1984  World Int. Prop. O. .............. 426/3

Primary Examiner—Jeanette Hunter
Attorney, Agent, or Firm—Daniel A. Scola, Jr.; Charles A. Gaglia, Jr.

[57] ABSTRACT

An anhydrous powdered fructose-sweetened chewing gum composition having enhanced flavor and sweetness perception, unique clean taste and non-gritty mouthfeel, up-front sweetness and soft chew texture including from about 5% to about 75% by weight of the composition of a soft PVA gum base, from about 25% to about 75% by weight of the composition of powdered fructose having a 70 mesh particle size, and one or more flavoring agents. An anhydrous reduced calorie chewing gum composition including from about 55% to about 75% by weight of the composition of a soft PVA gum base, from about 25% to about 45% by weight of the composition of powdered fructose having a 70 mesh particle size, and one or more flavoring agents.

15 Claims, 2 Drawing Sheets

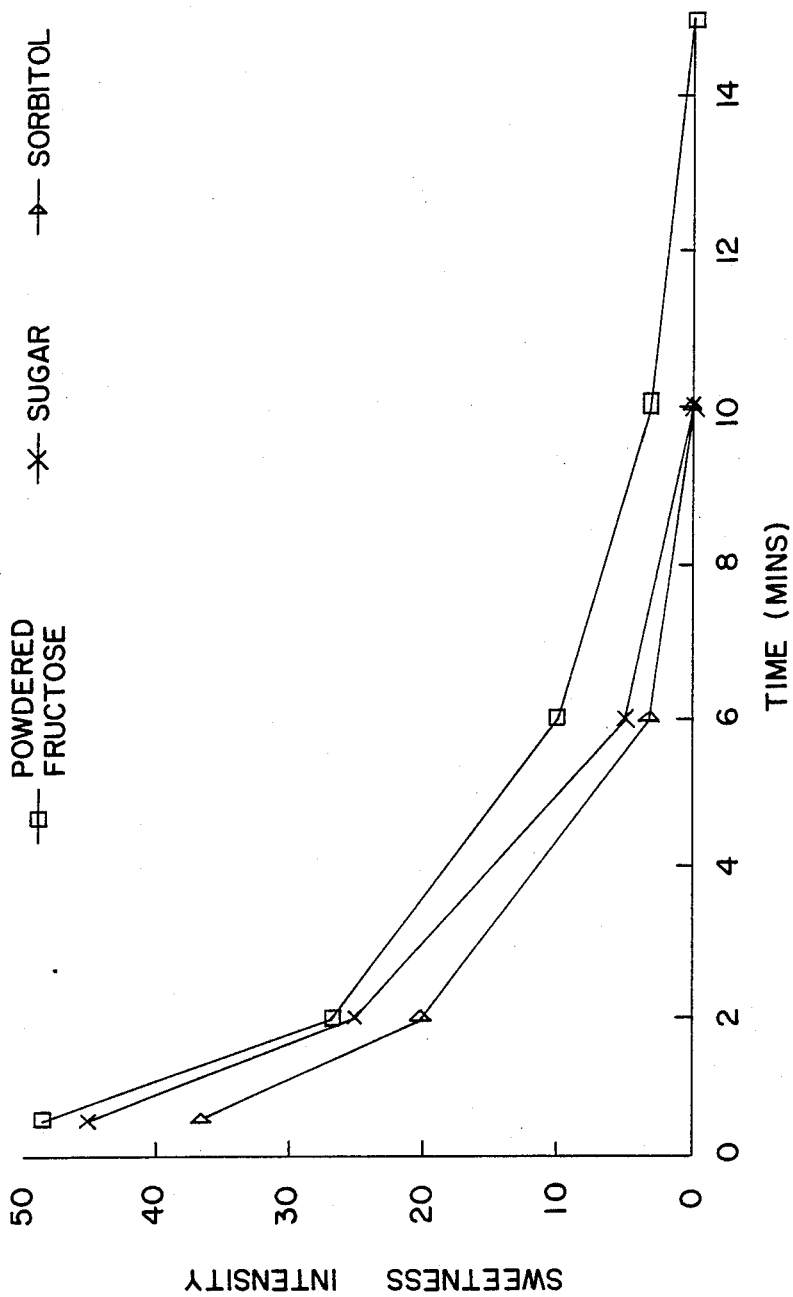

FRUCTOSE SWEETENED CHEWING GUM COMPOSITIONS

BACKGROUND OF THE INVENTION

The present invention relates to fructose-sweetened chewing gum compositions. More particularly, the present invention relates to fructose-sweetened chewing gum compositions having enhanced flavor, an increased rate of flavor and sweetness perception, longer flavor and sweetness duration, and better up-front sweetness, achieving such improvements through the use of powdered fructose as a bulk sweetening agent. The invention further relates to powdered-fructose sweetened chewing gum compositions having a reduced calorie content achieved by using less bulk sweetening agent without a loss of sweetness or flavor properties, attributable to the greater sweetness and flavor enhancement provided by powdered fructose.

Until recently, the use of fructose as a bulk sweetening agent was disfavored, despite the fact that fructose is one of the sweetest bulk sweetening agents known, being 132% sweeter than fructose. The sweetness of fructose compared to other bulk sweetening agents ordinarily would permit the formulation of chewing gum compositions of increased sweetness intensity. Additionally, compositions could be formulated using more gum base and less bulk sweetening agent to attain a reduction in calorie content. However, fructose is a humectant and, when used in conventional formulations in combination with an aqueous softening agent, resulted in compositions that gained moisture from the air under typical storage conditions. Consequently, fructose-sweetened products tended to suffer moisture-related product degradation and to soften and stick to the wrapper over time.

Resistance to moisture pick-up has been achieved for chewing gum compositions sweetened by fructose and other bulk sweetening agents in anhydrous formulations using a soft polyvinylacetate (PVA) gum base, as disclosed by U.S. Pat. No. 4,581,234. It is also known to achieve calorie reduction in chewing gum formulations by using a major amount, that is, an amount more than 50%, of a soft PVA gum base in combination with up to 0.60% intense sweetener and up to 40% of a bulk sweetening agent, including fructose. The intense sweetener permits the level of bulk sweetener to be reduced from conventional levels in excess of 50% without a sacrifice of product sweetness.

Fructose is a known flavor enhancer, and when used as a bulk sweetening agent in a chewing gum composition, is known to provide a cleaner, pleasant taste and mouthful to the composition, up-front sweetness, a soft chew texture, an improved rate of flavor and sweetness perception, and longer flavor and sweetness duration compared to equivalent formulations using other known bulk sweetening agents. Fructose has also been disfavored because it occurs in a crystalline form that imparts a gritty mouthfeel to chewing gum compositions when used as a bulk sweetening agent.

U.S. Pat. No. 4,271,199 discloses the use of fructose in a chewing gum having long-lasting sweetness and soft and smooth consistency, in which the fructose is used in the form of fructose recrystallized from high fructose syrup in combination with sucrose or sorbitol and water. Unlike the present invention, this patent uses crystalline fructose in combination with another bulk sweetening agent to avoid imparting moisture pick-up and a gritty mouthfeel to the chewing gum composition. U.S. Pat. No. 4,409,244 discloses the use of pure fructose syrup in place of corn syrup as the sweetener-plasticizer-bulking agent in chewing gum compositions. Unlike the present invention, this patent uses fructose syrup in combination with another bulk sweetening agent to avoid imparting moisture pick-up and a gritty mouthfeel to the chewing gum composition. U.S. Pat. No. 4,676,991 discloses a blend of fructose and sucrose useful as a sweetener in chewing gum compositions and other foodstuffs and having an increased sweetness intensity compared to products sweetened with an equivalent quantity of sucrose. Once more, the crystalline fructose is used in combination with another sweetening agent to avoid imparting moisture pick-up and a gritty mouthfeel to the chewing gum composition.

It has now been discovered that powdered fructose, having a particle size capable of passing through a 70 mesh screen, can be used as the sole bulk sweetening agent in a chewing gum composition and provide increased enhancement of the above-listed organoleptic properties compared to compositions using ordinary crystalline fructose, as well as the conventionally sweetened compositions of the prior art, without imparting moisture pick-up or a gritty mouthfeel. It has further been discovered that acceptable levels of sweetness can be achieved in a reduced calorie chewing gum compositions formulated with a major amount of soft PVA gum base, by using powdered fructose as the bulk sweetening agent.

Other advantages of the present compositions and process of preparation will become apparent from the detailed description provided therein.

SUMMARY OF THE INVENTION

The present invention is directed to chewing gum compositions, having enhanced sweetness and flavor perception, intensity and duration, better up-front sweetness, and other favorable organoleptic properties, using powdered fructose having a particle size capable of passing through a 70 mesh screen as the bulk sweetening agent. The compositions include a soft PVA gum base, flavoring agent and powdered fructose as a bulk sweetening agent.

The present invention is also directed to reduced calorie chewing gum compositions, formulated with powdered fructose as the bulk sweetening agent. The compositions include a soft PVA gum base, flavoring agent and powdered fructose as a bulk sweetening agent. Softening agent emulsifiers, fillers, mineral adjuvants and coloring agents may optionally be included.

The resulting composition demonstrates acceptable sweetness and flavor perception, intensity and duration, up-front flavor and sweetness perception and other favorable organoleptic properties, and lacks the gritty mouthfeel ordinarily experienced with fructose bulk-sweetened compositions.

The present invention includes compositions having from about 5% to about 75% by weight of the soft PVA gum base together with flavoring agents and from about 25% to about 75% by weight of the powdered fructose having a particle size capable of passing through a 70 mesh screen.

The reduced calorie compositions of the present invention include from about 55% to about 75% by weight of the soft PVA gum base together with flavoring agents and from about 25% to about 45% by weight of the powdered fructose bulk sweetening agent.

The compositions may be prepared by admixing melted gum base with a quantity of the powdered fructose until a uniform homogeneous mass is formed. The remaining quantity of fructose and flavoring agent are sequentially admixed, with each addition step followed by mixing until a uniform homogeneous mass is formed. The ratio of gum base to bulk sweetening agent will be between about 1:15 and about 3:1. If a softening agent is to be used, the melted gum base is admixed with the softening agent until a uniform homogeneous mass is formed prior to admixing the initial quantity of fructose. Once the fructose and flavoring agent have been admixed, the other formulation ingredients, if any, are admixed followed by mixing until a uniform homogeneous mass is formed. The mass is then extruded and formed into suitable chewing gum pieces.

BRIEF DESCRIPTION OF THE DRAWINGS

FIG. 2 shows perceived sweetness intensity over time for anhydrous chewing gum compositions having gum base content in excess of 50%.

DETAILED DESCRIPTION OF THE PREFERRED EMBODIMENT

Figure 1:
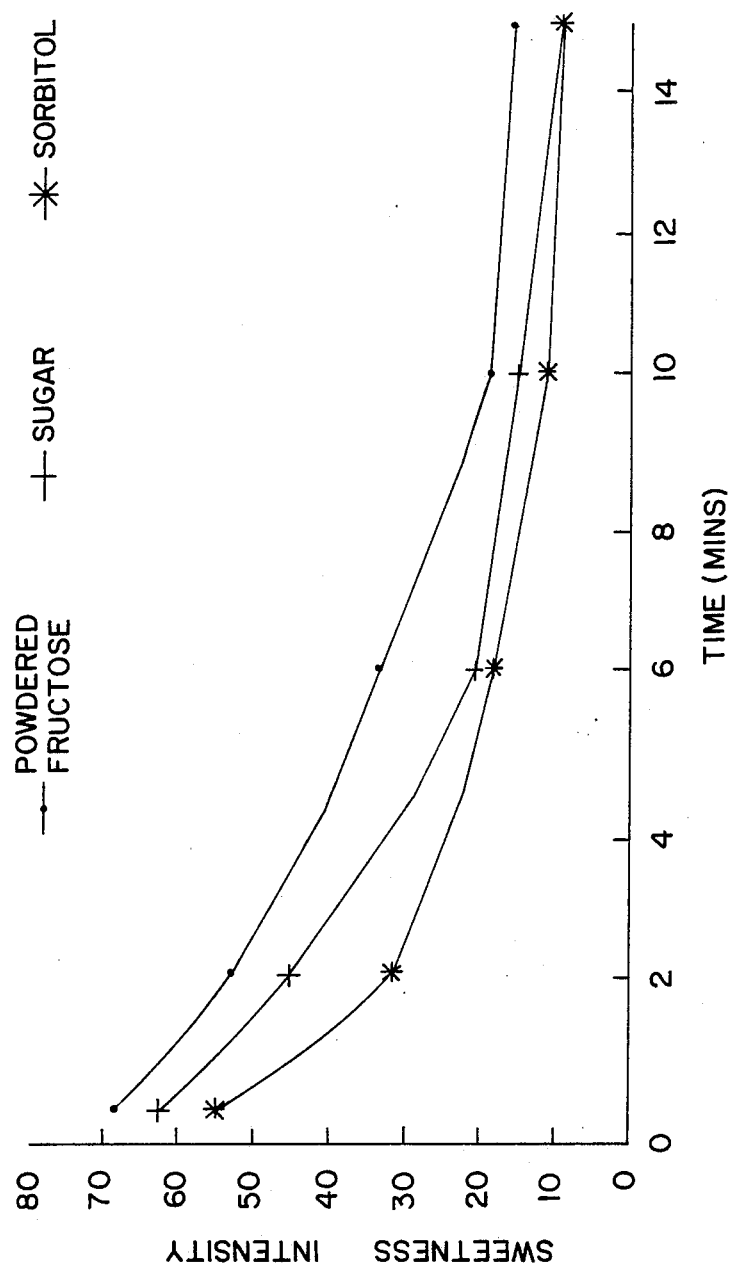
FIG. 1 shows perceived sweetness intensity over time for anhydrous chewing gum compositions.

The anhydrous fructose-sweetened chewing gums of the present invention can be prepared in a variety of gum combinations which can be made into a variety of products, e.g., sticks, slabs, chunks, balls, ropes, tablets, and/or center-filled products. The chewing gum compositions of the instant invention are defined as anhydrous in that they have a maximum moisture content of up to about 1.0% by weight of the final composition. Ingredients imparting a greater moisture content, such as aqueous softeners, are not used and the compositions therefore do not suffer from moisture instability and degradation due to excess pick-up of moisture from the atmosphere, despite the use of fructose. Non-anhydrous, or aqueous, chewing gum compositions by definition have a moisture content between about 1% and about 10% by weight of the final chewing gum composition and are unsuitable for use with a fructose bulk sweetening agent as these compositions would be subject to moisture instability.

The fructose-sweetened compositions of the invention have enhanced flavor and sweetness perception, intensity and duration, improved up-front flavor and sweetness, and other desirable organoleptic properties, including, but not limited to, a unique clean taste and soft mouthfeel and soft chew texture. The reduced calorie compositions maintain their desirable organoleptic properties when prepared with higher levels of gum base and lower levels of bulk sweetening agent, attributable to the higher sweetness intensity of fructose compared to other bulk sweetening agents. This permits the formulation of reduced calorie chewing gum compositions. The reduced calorie chewing gum of the invention will have a calorie content of less than 1/3 and preferably less than about 50% of that of conventional sugar containing and sugarless chewing gums, which have calorie values between three and four calories per gram.

Chewing gum formulations employing the novel composition of the present invention will vary greatly depending upon various factors such as the type of base used, consistency desired and other components used to make the final product. In general, amounts of gum base from about 5% to about 95% by weight of the final chewing gum composition are acceptable for use. The gum base used is a soft polyvinylacetate (PVA) containing gum base.

Soft PVA gum bases are defined as providing a hydrophilic chew character to the chewing gum which, when formulated into a chewing gum, results in a composition that absorbs moisture to swell and soften in the mouth. This results in a pleasant moist chew.

The amount of soft PVA gum base employed will vary greatly depending on various factors such as the intended calorie content of the final product, the type of base used and other components used to make the final product. In general, gum base amounts of about 50% to about 95% by weight of the final chewing gum composition are acceptable for use in reduced calorie chewing gum compositions with preferred amounts of about 50% to about 85% and more preferred amounts from about 60% to about 70% by weight. In gum base formulations in which calorie reduction is not an object, amounts of gum base up to 55% by weight of the final chewing gum composition are acceptable for use, with preferred amounts of about 15% to about 40% and more preferably from about 20% to about 35% by weight.

The soft PVA gum base used in this invention may be any water soluble gum base having PVA as an essential ingredient together with a natural or synthetic elastomer, or mixtures thereof. Such gum bases are known in the art and are not the subject of this invention. An example of such a soft PVA containing gum base is found in U.S. Pat. No. 4,490,395. Illustrative examples of natural elastomers in gum bases include, without limitation, substances of vegetable origin such as chicle, jelutong, balata, gutta-percha, crown gum, lechicapsi, sorba and the like and mixtures thereof. Examples of synthetic elastomers include, without limitation, isobutylene-isoprene copolymers, styrene-butadiene copolymers, polyethylene, polyisobutylene and mixtures thereof.

Vinyl polymers, and in particular PVA are an essential ingredient. The preferred PVA has a molecular weight of at least 2,000. Such materials are commercially available in various molecular weights which can be successfully used. The polyvinyl acetate is employed in amounts of about 5% to about 45% by weight and preferably about 7% to about 35% by weight of the gum base. These materials when used in such high amounts aid in extending the elastomer mixture while maintaining product integrity. Amounts below 5% cause the base to be unstable. Amounts above 45% cause segregation of the gum constituents to occur.

It is desirable to employ glyceryl monostearate as an emulsifier. When absent, the formulation has poor stability and lacks acceptable texture. It is believed that the glyceryl monostearate aids in bringing the normally imiscible constituents together in such a way that they form a single finely dispersed stable system. This emulsifier also simplifies the incorporation of flavors into the final base and aids in retaining finely divided solvents within the gum base complex. The glyceryl monostearate is employed in amounts of about 1% to about 15% and preferably about 3% to about 9%. Additional emulsifiers may also be included, notably lecithin, fatty acid monoglycerides, diglycerides and triglycerides, propylene glycol monostearate and mixtures thereof. Such materials may be used in the amount of about 1% to about 25% by weight.

The gum base formulation may also employ wax material. The waxes have been found to soften the polymer elastomer mixture and improve elasticity of the chew character. The waxes employed are preferably microcrystalline wax, paraffin wax and combinations thereof. Useful amounts are from about 2% to about 25% by weight and preferably from about 2.5% to about 20% by weight of the gum base composition. Preferably these waxes are used in combinations of about 5% to about 20% microcrystalline wax and about 3% to about 15% paraffin wax.

The gum base formulation may also contain elastomer solvents to aid in softening the polymer components. Such elastomer solvents comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin, and partially hydrogenated wood rosin and partially hydrogenated methyl ester of wood rosin; and terpene resins including polyterpene and polymers of alpha-pinene or beta-pinene and mixtures thereof.

In reduced calorie gum base compositions, the elastomer solvents may be employed in amounts ranging from about 3% to about 25% and preferably from about 8% to about 18% by weight of the gum base. Amounts below about 3% cause the chew characteristic to be hard and result in inconsistent flavor release. Amounts above 25% cause a soft product to form which destroys the chew characteristic. In other soft PVA gum base compositions, the solvents may be employed in amounts ranging from about 10% to about 75% and preferably from about 45% to about 70% by weight of the gum base.

A variety of traditional ingredients such as plasticizers or solvents may optionally be added to the gum base. These materials are optional and not essential in the present formulation. Such materials include hydrogenated vegetable oils, lanolin, stearic acid, sodium stearate, potassium stearate, glyceryl triacetate, triacetin, glycerin and the like and mixtures thereof. Such materials, when incorporated into the gum base, obtain a variety of desirable texture and consistency properties. These individual materials are generally employed in amounts of up to about 30%, preferably in amounts from about 1% to about 25% by weight and more preferably in amounts of from about 1.5% to about 12% by weight of the gum base composition. Because of the low molecular weight of these compounds, they are able to penetrate the fundamental structure of the base, making it plastic and less viscous.

As stated above, the bulk sweetening agent is powdered fructose. Fructose is commercially available in cyrstalline form, which when used as a bulk sweetening agent, results in chewing gum compositions sweeter than equivalent compositions containing an equivalent amount of one of the other known bulk sweetening agents. The fructose-sweetened chewing gum compositions have a unique clean taste, up-front sweetness, enhanced flavor, soft chew texture and other desirable organoleptic properties. However, such compositions are known to possess a gritty mouthfeel when sweetened by fructose alone, attributable to the fructose crystals. When formulated in an increased gum base/reduced bulk sweetener, reduced calorie composition, the higher sweetness and other enhanced qualities compensate for the bulk sweetener reduction to result in a composition having acceptable organoleptic properties, except for the gritty mouthfeel.

When powdered fructose capable of passing through a 70 mesh screen, hereinafter referred to as powdered fructose having a 70 mesh particle size, is used as a bulk sweetener in reduced and non-reduced calorie chewing gum compositions, the resulting chewing gum compositions are 20% sweeter than equivalent compositions sweetened with crystalline fructose and even more sweeter than equivalent compositions using other bulk sweetening agents. The other organoleptic properties noted above are also improved and there is a further enhancement in the duration and rate of perception of sweetness and flavor. The gritty mouthfeel imparted to chewing gum compositions by crystalline fructose is also eliminated.

Powdered fructose having a 70 mesh particle size is prepared by milling crystalline fructose by conventional means known to those skilled in the art. Crystalline fructose may be powderized in high speed pulverizing equipment such as a Fitzpatrick mill. The speed of the machine and the screen used therein can be varied by one of average skill in the art to obtain the desired powder fineness.

A comparison of the particle size distribution for the crystalline and powdered fructose of the present invention is shown in Table 1.

TABLE 1

| SCREEN ANALYSIS OF CRYSTALLINE AND POWDERED FRUCTOSE | | |
|---|---|---|
| Particle Size | Crystalline | Powdered |
| 40 Mesh | 20.62% | 0.00% |
| 60 Mesh | 57.10 | 0.00 |
| 80 Mesh | 15.35 | 97.00 |
| PAN | 6.95 | 3.00 |

While not wishing to be bound by any theory, it is believed that powdered fructose more readily dissolves from the matrix of the chewing gum composition when chewed and that the sweetness and flavor enhancement provided by powdered fructose, as well as improved up-front sweetness results from its faster availability.

In general, the amount of bulk sweetening agent in the final chewing gum composition may vary with the desired amount of sweetness and calorie content selected for a particular chewing gum composition. The total amount of bulk sweetening agent should be a quantity adequate to provide sufficient discontinuity to the gum base. This amount will normally be less than 50% by weight in reduced calorie compositions. In such compositions, the bulk sweetening agent is preferably used in amounts of at least 5% to about 35% by weight, and most preferably from about 10% to about 25% by weight of the final chewing gum composition.

For chewing gum compositions in which calorie reduction is not an objective, the bulk sweetening agent is preferably used in amounts from about 25% to about 75% by weight and most preferably in amounts from about 50% to about 65% by weight of the final chewing gum composition.

The chewing gum compositions of the present invention may optionally contain an intense sweetening agent. Acceptable intense sweetening agents include water-soluble artificial sweetening agents such as the soluble saccharin salts (i.e., sodium or calcium saccharin salts, cyclamate salts, acesulfame-K and the like, and the free acid form of saccharin, dipeptide-based artificial sweetening agents such as L-aspartyl-L-phenylalanine methyl ester and materials described in U.S. Pat. No. 3,492,131 and the like, and chlorosucrose derivatives.

The intense sweetening agents are used in amounts of about 0.0005% to about 5.0% and most preferably about 0.05% to about 2.5% by weight of the final chewing gum composition. These amounts are ordinarily necessary to achieve the desirable sweetness independent of the flavoring level achieved from flavor oils.

The chewing gum compositions of the present invention may optionally include an anhydrous softening agent to fine tune the initial firmness of the product as well as the degree of ultimate softening resulting from moisture pickup and retention. Acceptable softening agents include lecithin, glycerine, triacetin, hydrogenated vegetable oils, mineral oils, polyglycerol esters of fatty acids and mixtures thereof. The softening agents are generally used in amounts between about 2% and about 8% by weight, and preferably in amounts between about 4% and about 6%.

The present invention also contemplates the encapsulation of some or all of the flavoring agent, the sweetening agent, and mixtures thereof to prolong the duration of flavor and sweetness sensation.

Encapsulated delivery systems for flavoring agents or sweetening agents comprise a hydrophobic matrix of fat or wax surrounding a sweetener or flavoring component core. The fats may be selected from any number of conventional materials such as fatty acids, glycerides or polyglycerol esters, sorbitol esters, and mixtures thereof. Examples of fatty acids include hydrogenated and partially hydrogenated vegetable oils such as palm oil, palm kernel oil, peanut oil, rapeseed oil, rice bran oil, soybean oil, cottonseed oil, sunflower oil, safflower oil and mixtures thereof. Other fatty acid oils are contemplated. Glycerides which are useful include mono-, di- and triglycerides.

Waxes useful are chosen from among the group consisting of natural or synthetic waxes and mixtures thereof. Non-limiting examples include paraffin wax, petrolatum, carbowax, microcrystalline wax, beeswax, carnuba wax, candellila wax, lanolin, bayberry wax, sugarcane, spermaceti wax, rice bran wax and combinations thereof.

The fats and waxes may be used individually or in combination in amounts varying from about 10 to about 70% by weight of the delivery system, and preferably in amounts of about 40 to about 58% by weight. When used in combination, the fat and wax are preferably present in a ratio of about 70:10 to about 85:15 of fat to wax.

Typical encapsulated flavor or sweetness delivery systems are disclosed in U.S. Pat. No. 4,597,970 and U.S. Pat. No. 4,722,845.

Flavoring agents well known in the chewing gum art may be added to the chewing gum compositions of the instant invention. These flavoring agents may be chosen from synthetic flavor oils, flavorings and/or oils derived from plants, leaves, flowers, fruits and so forth, and combinations thereof. Representative flavor oils include: spearmint oil, cinnamon oil, oil of wintergreen (methylsalicylate) and peppermint oils as well as their flavoring replacements. Also useful are artificial, natural or synthetic fruit flavors such as citrus oil including lemon, orange, grape, lime and grapefruit and fruit essences including apple, strawberry, cherry, pineapple, banana and so forth. Other fruit flavors well known to the art are also employable. Mixtures can be employed.

A preferred flavoring agent is peppermint oil, the flavor perception of which is enhanced by the fructose bulk sweetening agent, which does not mask flavoring agents. Chewing gum compositions flavored with peppermint oil, for example, and prepared using fructose bulk sweetening agent are more pleasant tasting and have a more cooling, cleaner taste than similarly flavored compositions prepared using other bulk sweetening agents. The flavor enhancement is even more pronounced with the powdered fructose bulk sweetening agent having a 70 mesh particle size.

The amount of flavoring agent employed is normally a matter of preference subject to such factors as flavor type, base type and strength desired. In general, amounts of about 0.05% to about 3.0% by weight of the final chewing gum composition are usable with amounts of about 0.3% to about 1.5% being preferred and about 0.7% to about 1.2% being most preferred.

The chewing gum composition of this invention may additionally include fillers such as dicalcium phosphate, aluminum hydroxide, alumina, aluminum silicates, talc, calcium carbonate and combinations thereof. The total amount of fillers present is generally up to about 10% by weight. The colorants useful in the present invention include the pigments that may be incorporated in amounts of up to about 6% by weight and preferably up to about 1% by weight. A preferred pigment is titanium dioxide, also the colorants may include other dyes suitable for food, drug, and cosmetic applications, and known as the FD&C dyes and the like. The materials accessible for the foregoing spectrum of use are preferably water soluble. Illustrative examples include the indigo dye, known as FD&C Blue No. 2, which is the disodium salt of the 5,5-indigotindisulfonic acid. Similarly, the dye known as FD&C Green No. 1, comprises a triphenylmethane dye and is the monosodium salt of 4,[4-N-ethyl-p-(sulfobenzylamino) diphenylmethylene]-[1(N-ethyl-p-sulfoniumbenzyl)-2,5-cyclohexadienimine]. A full recitation of all FD&C and D&C colorants and their corresponding chemical structures may be found in the Kirk-Othmer Encyclopedia of Chemical Technology, 3rd Edition, in Volume 6 at pages 561-595, which text is accordingly incorporated herein by reference.

The process embodying the method of the present invention is as follows. The gum base is conventionally melted at temperatures that may range from about 40° C. to about 120° C. for a period of time sufficient to render the base molten. For example, the gum base may be heated under these conditions for a period of about 30 minutes just prior to mixing with the remaining ingredients of the gum composition.

A preferred procedure involves mixing the gum base with a portion of the powdered fructose bulk sweetening agent (normally ⅔ to ¾), until a uniform homogeneous mass is obtained, preferably up to 5 minutes. If a softening agent is to be used, this is first mixed with the gum base until a uniform homogeneous mass is obtained, followed by the portion of the bulk sweetening agent. The remaining bulk sweetening agent and flavoring are added and again blended to form a uniform composition. Finally, the water soluble artificial sweetener and/or the dipeptide based sweetener, if any, is added along with the remainder of the ingredients, including the colorant, if any, and other additives, and the resulting composition is then mixed for a period of time that may range as high as 30 minutes, to form a fully uniform homogeneous composition. The mass is then removed from the mixer and may be formed into various final shapes by known gum manufacturing techniques. For example, the mass may be rolled into contact with a conventional dusting medium, such as calcium carbonate, mannitol, talc and others.

The techniques associated with the preparation of the products are well known and the present method may vary somewhat depending upon the specific end product to be manufactured, without departing from the essential parameters related to the addition of the powdered fructose bulk sweetening agent. Such other details are presented for purposes of illustration and to provide a best mode for the practice of the invention, and therefore the invention should not be limited to those parameters.

Chewing gum products made by the above process using the disclosed formulations have remained fresh, soft and pliable with a minimum of protective packaging, and are capable of being exposed to storage conditions without sticking to the wrapper. The products have a soft and smooth texture when chewed and lack the gritty mouthfeel ordinarily experienced with chewing gum compositions sweetened solely with fructose. This advantage is attributable to the combination of chewing gum ingredients processed in the manner described.

The following examples are given to illustrate the invention, but are not deemed to be limiting thereof. All percentages given throughout the specification are based upon weight unless otherwise indicated.

EXAMPLES

EXAMPLES 1-4

Comparative samples of chewing gum compositions are prepared, sweetened with sorbitol, sucrose, crystalline fructose and powdered fructose according to the formulations listed in Table 2.

TABLE 2

| Examples Ingredients | 1 | 2 | 3 | 4 |
|---|---|---|---|---|
| | \multicolumn{4}{c}{Percent (w/w)} | | | |
| Gum Base | 28.00 | 28.00 | 28.00 | 28.00 |
| Bulk Sweetener | | | | |
| Fructose Powder | 64.60 | — | — | — |
| Fructose Crystal | — | 64.60 | — | — |
| Sorbitol | — | — | 64.60 | — |
| Sugar 6X | — | — | — | 64.60 |
| Softening Agent | | | | |
| Glycerine | 5.00 | 5.00 | 5.00 | 5.00 |
| Lecithin | 0.50 | 0.50 | 0.50 | 0.50 |
| Flavor[1] | 1.90 | 1.90 | 1.90 | 1.90 |

The samples were evaluated by a test panel for sweetness, flavor and texture, the results of which are depicted in FIG. 1. The composition sweetened with fructose crystals were rated as 10% sweeter than the composition sweetened with sugar and 20-25% sweeter than the composition sweetened with sorbitol. The crystalline fructose sweetened composition was also rated as having enhanced flavor intensity and greater up-front sweetness compared to the sugar and sorbitol sweetened compositions. The crystalline fructose sweetened composition, however, had a gritty mouthfeel. The powdered fructose sweetened composition was even sweeter than the crystalline fructose sweetened composition, and was rated as being 20% sweeter than the composition sweetened with sugar and 30-35% sweeter than the composition sweetened with sorbitol.

The powdered fructose sweetened composition was also rated as having enhanced flavor intensity and greater up-front sweetness compared to the sugar and sorbitol sweetened compositions, greater than the flavor enhancement and up-front sweetness noted in the crystalline fructose sweetened composition. The powdered fructose sweetened composition also had a smooth, non-gritty mouthfeel.

EXAMPLES 5-8

Comparative samples of reduced calorie chewing gum compositions are prepared, sweetened with sorbitol, sucrose, crystalline fructose and powdered fructose according to the formulations listed in Table 3.

TABLE 3

| Examples Ingredients | 5 | 6 | 7 | 8 |
|---|---|---|---|---|
| | \multicolumn{4}{c}{Percent (w/w)} | | | |
| Gum Base | 65.00 | 65.00 | 65.00 | 65.00 |
| Bulk Sweetener | | | | |
| Fructose Powder | 28.20 | — | — | — |
| Fructose Crystal | — | 28.20 | — | — |
| Sorbitol | — | — | 28.20 | — |
| Sugar 6X | — | — | — | 28.20 |
| Softening Agent | | | | |
| Glycerine | 4.00 | 4.00 | 4.00 | 4.00 |
| Lecithin | 0.20 | 0.20 | 0.20 | 0.20 |
| Flavor[2] | 2.60 | 2.60 | 2.60 | 2.60 |

The samples were evaluated by a test panel for sweetness, flavor and texture, the results of which are depicted in FIG. 2. The same degree of increased sweetness of the crystalline fructose and powdered fructose sweetened compositions over sugar and sorbitol sweetened compositions was noted. Similar flavor enhancement and up-front sweetness in the fructose sweetened compositions was noted compared to the sugar and sorbitol sweetened compositions. Again, the powdered fructose sweetened composition had the most sweetness, flavor enhancement and up-front sweetness. Also, the crystalline fructose sweetened composition had a gritty mouthfeel, while the powdered fructose sweetened composition had a smooth mouthfeel.

This invention being thus described, it will be obvious that the same may be varied in many ways. Such variations are not to be regarded as a departure from the spirit and scope of the invention and all such modifications are intended to be included within the scope of the following claims.

We claim:

1. An anhydrous chewing gum composition comprising:
    soft PVA gum base in an amount from about 5% to about 75% by weight of said composition;
    powdered fructose having a particle size capable of passing through a 70 mesh screen, in an amount from about 25% to about 75% by weight of said composition; and
    one or more flavoring agents.

2. The chewing gum composition of claim 1, wherein said gum base comprises PVA and a natural or synthetic elastomer selected from the group consisting of chicle, jelutong, gutta percha, crown gum, isobutylene-isoprene copolymer, styrene-butadiene copolymer, polyethylene, polyisobutylene and mixtures thereof.

3. The chewing gum composition of claim 1, further comprising an anhydrous softening agent selected from the group consisting of lecithin, glycerin, hydrogenated vegetable oils, triacetin, mineral oils, polyglycerol esters of fatty acids, and mixtures thereof in an amount from about 2% to about 8% by weight of said composition.

4. The chewing gum composition of claim 1, wherein said flavoring agent is selected from the group consisting of peppermint oil, spearmint oil, oil of wintergreen, fruit flavors and mixtures thereof.

5. The chewing gum composition of claim 4, wherein said flavoring agent is peppermint oil.

6. The chewing gum composition of claim 4, wherein said flavoring agent is encapsulated in a hydrophobic mixture of fat or wax.

7. The chewing gum composition of claim 1, further comprising an additive selected from the group consisting of emulsifiers, bulking agents, fillers, mineral adjuvants, coloring agents and mixtures thereof.

8. The chewing gum composition of claim 1, further comprising an intense sweetening agent selected from the group consisting of water-soluble artificial sweetening agents, dipeptide based sweetening agents, chlorosucrose derivatives, and mixtures thereof.

9. The chewing gum composition of claim 8, wherein said dipeptide based sweetening agent is L-aspartyl-L-phenylalanine methyl ester.

10. The chewing gum composition of claim 1, wherein said gum base is present in an amount between about 20% and about 35% by weight of said composition.

11. The chewing gum composition of claim 1, comprising
soft PVA gum base in an amount from about 55% to about 75% by weight of said composition;
powdered fructose bulk sweetening agent having a 70 mesh particle size in an amount from about 25% to about 45% by weight of said composition; and
one or more flavoring agents.

12. The chewing gum composition of claim 11, wherein said gum base comprises PVA and a natural or synthetic elastomer selected from the group consisting of chicle, jelutong, gutta percha, crown gum, isobutylene-isoprene copolymer, styrene-butadiene copolymer, polyethylene, polyisobutylene and mixtures thereof.

13. The chewing gum composition of claim 11, wherein said gum base is present in an amount between about 60% to about 70% by weight of said composition.

14. A method of preparing a chewing gum composition comprising:
admixing melted soft PVA chewing gum base with a first quantity of powdered fructose bulk sweetening agent having a particle size capable of passing through a 70 mesh screen, until a uniform mixture is formed, said gum base and said fructose being substantially moistureless;
admixing optional fillers and colorants until a uniform mixture is formed;
admixing a second quantity of said fructose until a uniform mixture is formed, said fructose and gum base being in a ratio between about 1:15 and about 3:1;
admixing flavoring agent and mixing until a homogeneous mass is formed; and
forming said homogeneous mass into suitable chewing gum pieces.

15. The process of claim 14, wherein prior to admixing said melted chewing gum base with said bulk sweetening agent, said gum base is admixed with a softening agent selected from the group consisting of lecithin, glycerin, hydrogenated vegetable oils, triacetin, mineral oils, polyglycerol esters of fatty acids, and mixtures thereof, until a uniform mixture is formed.

* * * * *